April 13, 1965 H. W. MATHERS 3,178,581

FLUX GAIN MULTIAPERTURE-CORE LOGIC CIRCUIT

Filed Dec. 30, 1960 2 Sheets-Sheet 1

INVENTOR
HARRY W. MATHERS
BY Bernard N. Wiener
ATTORNEY

April 13, 1965 H. W. MATHERS 3,178,581

FLUX GAIN MULTIAPERTURE-CORE LOGIC CIRCUIT

Filed Dec. 30, 1960 2 Sheets-Sheet 2

United States Patent Office 3,178,581
Patented Apr. 13, 1965

3,178,581
FLUX GAIN MULTIAPERTURE-CORE LOGIC CIRCUIT

Harry W. Mathers, Owego, N.Y., assignor to International Business Machines Corporation, New York, N.Y., a corporation of New York Filed Dec. 30, 1960, Ser. No. 79,844
1 Claim. (Cl. 307—88)

This invention relates to multiaperture-core logic circuits and more particularly to a capacitor-coupled multiaperture-core logic circuit in which binary information stored as a condition of a magnetic state of a precedent core is transferred to a subsequent core as a condition of a magnetic state thereof during discharge of the coupling capacitor therebetween.

In copending application, Serial No. 79,619 filed the same day as the present application, whose inventor is Robert Betts and which is assigned to the same assignee, the transfer of binary information from a precedent multiaperture-core to a subsequent multiaperture-core occurs during discharge of the coupling capacitor therebetween. The transfer of the information results from the switching of a condition of a flux state of the precedent core. The voltage available due to the switching of the flux has limited the effectiveness with which the binary information can be transferred to a plurality of subsequent cores. This has been due to the limited amount of flux itself. Further, with multiple binary information inputs to the precedent multiaperture-core there has been a tendency for ringing to occur in the output circuit of the subsequent core. Ringing is the undesired switching of stored flux in the subsequent core due to overdriving the input thereof. The plurality of inputs cause the output capacitor of the subsequent core to charge to such a sufficiently high voltage that the discharge thereof results in the undesired ringing.

It is an object of this invention to provide a capacitor-coupled multiaperture-core logic circuit in which the flux available for switching in a precedent core for transfer of binary information to a subsequent core is increased by special relationship of the capacitor and the core configuration.

It is another object of this invention to provide a multiaperture-core logic circuit having a flux gain characteristic in the output leg of each precedent core.

It is still another object of this invention to provide a multiaperture-core logic circuit in which information stored in a precedent core is transferred to a subsequent core with minimum ringing in the output circuit thereof.

The foregoing and other objects, features and advantages of the invention will be apparent from the following more particular description of a preferred embodiment of the invention, as illustrated in the accompanying drawings.

This invention provides a capacitor-coupled flux-gain multiaperture-core logic circuit. Binary information stored in a condition of the magnetic flux state of a precedent core is transferred to a condition of the magnetic flux state of a subsequent core during discharge of the coupling capacitor therebetween. The relative magnitude of the areas of the input leg and output leg of the flux-gain core are such that the latter is larger than the former. Each subsequent core is itself a precedent core of another subsequent core of the logic circuit to which its stored binary information is transferred. Thus, there are two coupling capacitors which must be considered. The first coupling capacitor aids in the transfer of information. The second aids the storage of the information. When the first coupling capacitor discharges, it causes a flux change in the input and output legs of the subsequent multiaperture-core. Because of the flux-gain nature of the subsequent core, the discharge of the second capacitor causes additional flux to be switched in its output leg.

A multiaperture-core logic circuit may be made to have several desirable properties: (1) multiple inputs, i.e., one or several inputs can transfer binary information into a core; (2) sequential inputs, i.e., the inputs may be simultaneous or sequential; (3) isolation between inputs, i.e., the flux around any input aperture can be reversed independently of all other input apertures; and (4) isolation between input and output, i.e., the flux around the output aperture can be switched with no coupling to the input windings and the flux around the input apertures can be reversed with no coupling to the output winding.

Figure 2:
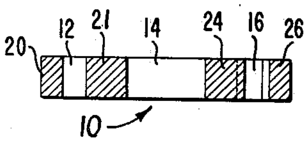
FIGURE 2 is a cross-section of FIG. 1 taken on the line 2—2 illustrating the areas of the legs of the flux-gain multiaperture-core.
Figure 1:
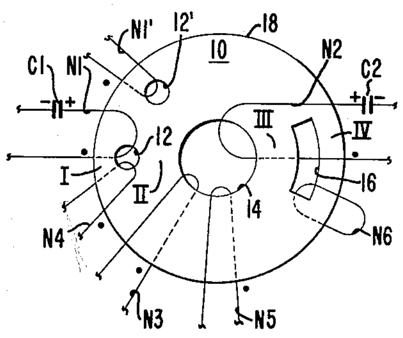
FIGURE 1 shows the flux-gain multiaperture-core in accordance with this invention and illustrative windings thereon.

With reference to FIG. 1, flux-gain multiaperture-core 10 with periphery 18 has apertures 12, 12', 14 and 16 therein. The apertures establish legs I, II, III and IV in the core defining areas 20, 23, 24 and 26, respectively, as seen best in FIG. 2. While in FIGS. 1 and 2 the core is shown as a cylinder of thickness uniform, the thickness may vary provided the area is in accordance with this invention. The circumferential locations of apertures 12 and 16 may be somewhat arbitrary. The sole requirement is that they define legs in the core suitable for the practice of this invention.

For the practice of this invention, the ratio of the areas of legs I and III may vary considerably dependent on the circuit parameters. However, it has been determined that a ratio in the range of 1.5 to 2 has been satisfactory. It is critical that the area of leg III be greater than the area of leg I. In core 10 of FIG. 1, the area of leg I equals ½ the area of leg III; leg I equals leg IV and leg II equals III.

An input capacitor C1 is shown coupled via winding N1 and leg I to multiaperture-core 10. An output capacitor C2 is coupled by winding N2 and leg III to multiaperture-core 10. In the operation of the OR logic circuit to be described more completely with reference to FIG. 6, a capacitor C1 discharge into winding N1 switches the flux in leg I and an equivalent amount of flux in leg III. The switching of flux in leg III charges capacitor C2 as shown in FIG. 1. Since the area of leg I is one-half that of leg III, only one-half of the flux in leg III is switched. FIG. 5b shows a possible flux pattern when the voltage on capacitor C2 is a maximum. The discharge current of capacitor C2 switches the remaining flux in leg III. The flux pattern after capacitor C2 has discharged is illustrated by FIG. 5c. All the flux that was switched in leg III is available at output time. This additional flux makes branching to a plurality of cores easily accomplished. In addition, the flux change during capacitor C2 discharge dampens the ringing of the output circuit connected to it. This prevents any loss of flux in leg III when the core 10 has received more than one simultaneous input.

Figure 5:
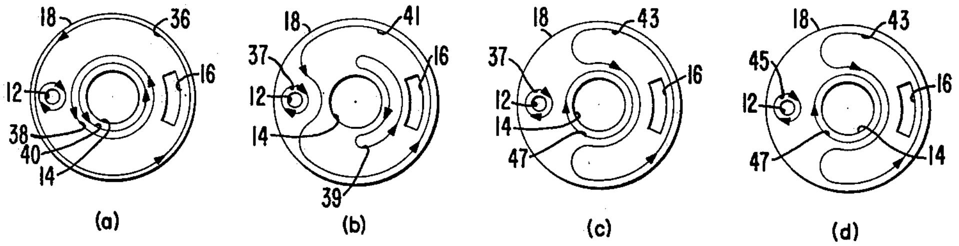
FIGURE 5 illustrates magnetic flux conditions within the multiaperture-core of FIG. 1 suitable for explanation of the switching characteristics thereof.

Illustrative magnetic flux paths for multiaperture-core 10 suitable for explanation of this invention are shown in FIG. 5. FIG. 5a is the reset state obtained by pulsing core 10 reset winding N5. Two magnetic flux paths are shown traversing legs II and III and one flux path is shown traversing legs I and IV. The flux paths are counter-clockwise. Each path represents an equal number of lines of flux.

FIGURE 5b illustrates the magnetic flux paths in mutliaperture-core 10 after the input capacitor C1 has discharged and capacitor C2 has charged to its peak voltage. It is seen that a flux line encircles aperture 12 and traverses legs I and II clockwise. One-half of the flux in leg III has been switched. As output capacitor C2 discharges, the remaining counter-clockwise flux in leg III is switched and the final condition is shown in FIG. 5c.

Figure 3:
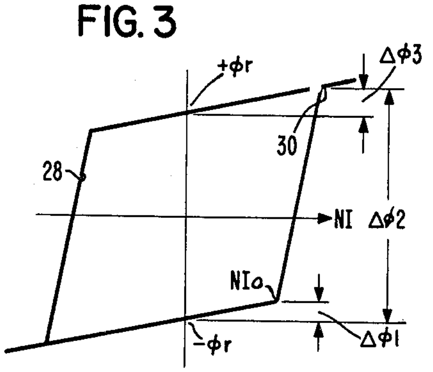
FIGURE 3 is an idealized hysteresis loop suitable for explaining the conditions of a magnetic flux state of any given cross-section of a multiaperture-core.

An idealized substantially rectangular hysteresis loop 28 for a magnetic flux state of a leg of multiaperture-core 10 is shown in FIG. 3. The total flux in a leg area is the ordinate $\phi$. The driving ampere-turns is the abscissa NI. The two remanent flux conditions for the state are $+\phi r$ and $-\phi r$. The flux is the reset condition in any leg of core 10 when it is at point $-\phi r$. The set state is $+\phi r$. If the flux condition of a leg is at point $-\phi r$, and a positive driving ampere-turns $NIo$ is applied to the leg, a small flux change $\Delta\phi 1$ occurs. When the driving ampere-turns sufficiently exceeds $NIo$, the flux condition of core 10 is switched to point 30 with a consequent large flux change $\Delta\phi 2$. If the flux condition of the leg were at $+\phi r$, and the same driving ampere-turns are applied to the leg, a small flux change $\Delta\phi 3$ occurs. The voltage induced in a winding on a leg of core 10 is proportional to the rate of flux change in the leg coupled to the winding. Therefore, the output voltage from a change of the flux condition therein depends upon the magnitude and direction of the applied driving ampere-turns and whether the flux condition is $+\phi r$ or $-\phi r$.

Figure 4:
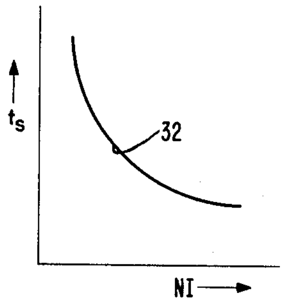
FIGURE 4 is an illustrative curve showing the inverse relationship between the switching-time of a condition of a magnetic flux state of a multiaperture-core and the driving ampere-turns therefor.

FIG. 4 illustrates by curve 32 the relationships between the time of switching of a magnetic flux condition of a core leg and the magnitude of the driving ampere-turns therefor.

The various conditions of the core 10 and the manner in which each is obtained will be understood through consideration of FIGS. 1 and 5. A condition is shown as a possible flux path. The illustrative flux paths in FIGS. 5a, b and c will assist in the understanding of this invention.

Input winding N1 encircles leg I via aperture 12 and periphery 18. Output winding N2 encircles leg III via apertures 14 and 16. Drive winding N3 encircles the multiaperture-core 10 via aperture 14 and periphery 18. Input reset winding N4 encircles leg I via aperture 12 and periphery 18. Core reset winding N5 encircles the multiaperture-core via aperture 14 and periphery 18. Inhibit winding N6 encircles leg IV via aperture 16 and periphery 18. Inhibit winding N6 is a shorted turn which prevents change of flux in leg IV.

According ot the convention used herein, current into the dot side of a winding drives the flux in the leg associated therewith toward the reset condition $-\phi r$. The voltage induced in any other winding coupled to the driven winding is positive at its dot terminal, and current flows from a dot of any load winding. Current into a non-dot drives the flux toward the set state $+\phi r$. The entire core reset condition shown in FIG. 5a results from current applied to the dot of core reset winding N5. Current into the non-dot side of input winding N1 switches the core 10 to the after input condition shown in FIG. 5b. FIG. 5c shows the flux condition after capacitor C2 has discharged. The after input-reset condition shown in FIG. 5d is obtained by applying current to the dot end of input reset winding N4 with no effect on the remainder of the core.

Figure 6:
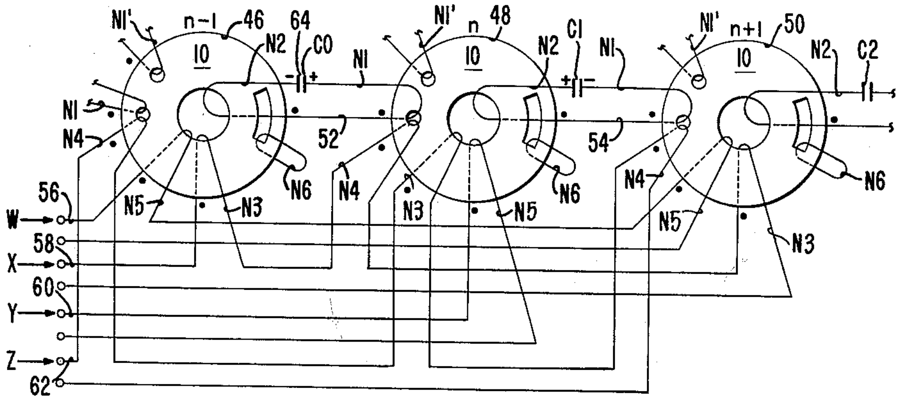
FIGURE 6 illustrates a capacitor-coupled multiaperture-core logic circuit in accordance with this invention.
Figure 7:
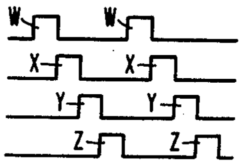
FIGURE 7 illustrates the clock pulse timing curves for the multiaperture-core OR logic circuit of FIG. 6.

FIG. 7 is a clock pulse timing diagram for the OR logic circuit in accordance with this invention shown in FIG. 6. The particular flux conditions of the core 46 or the OR logic circuit for the clock pulses W, X, Y and Z will be understood through reference to FIG. 5. The flux paths shown in FIG. 5 are merely illustrative.

FIG. 5a illustrates the magnetic flux conditions in multiaperture-core 10 after clock pulse W is applied to core reset winding N5. Flux path 36 traverses legs I and IV and flux paths 38 and 40 traverse legs II and III in the manner shown, i.e., counter-clockwise.

FIG. 5b illustrates the magnetic flux paths in multiaperture-core 10 after an input pulse occurs on input N1 at input time Y. FIG. 5b shows flux path 37 encircling aperture 12 clockwise and flux path 41 encircling counter-clockwise apertures 14 and 16. One-half of the flux in leg III has been switched and closes on the remaining flux in leg III as illustrated by path 39.

FIG. 5c illustrates the flux paths in multiaperture-core 10 after capacitor C2 has discharged and switched the counter-clockwise flux in leg III to the clockwise condition.

FIG. 5d illustrates the flux paths in multiaperture-core 10 after the flux around aperture 12 in legs I and II is reversed at Z clock time.

The clock pulses W, X, Y and Z shown in FIG. 7 are a plurality of sequential pulses which define a timing period for the OR logic circuit of FIG. 6.

FIG. 6 presents an OR logic circuit in accordance with this invention. Sequential cores 46, 48 and 50 are coupled via capacitor circuits 52 and 54, respectively. Capacitor circuit 52 encircles leg III of core 46 and leg I of core 48. Capacitor circuit 54 encircles leg III of core 48 and leg I of core 50. Clock pulse W energizing line 56 energizes drive winding N3 of cores 46 and 50. Clock pulse X energizing line 58 energizes core reset winding N5 of core 46, input reset winding N4 of core 48, and core reset winding N5 of core 50. Clock pulse Y energizing line 60 energizes drive winding N3 of core 48. Clock pulse Z energizing line 62 energizes input reset winding N4 of cores 46 and 50 and core reset winding N5 of core 48. It is assumed that cores 46 and 50 are in the input reset condition shown in FIG. 5d and core 48 is in the reset condition shown in FIG. 5a. Cores 46 and 50 are defined as being in the "1" state and core 48 is defined as being in the "0" state. A current pulse at clock time W on clock pulse W energizing line 56 resets cores 46 and 50 establishing a counter-clockwise current in capacitor coupling circuit 52 thereby charging capacitor 64. Since core 48 is in the reset condition, the charging current has no effect thereon. Further, cores 46 and 50 will have no voltage generated across their input windings N1 since the flux is already in the reset direction in leg I. When the output voltage from core 46 becomes smaller than the voltage on input capacitor 64, current in capacitor circuit 52 reverses and switches core 48 to the condition of FIG. 5b.

The particular timing arrangement for the OR logic circuit of FIG. 6 is now presented another way. Assume cores $(n-1)$ and $(n+1)$ are in the input reset condition (FIG. 5d) and core $n$ is in the reset condition (FIG. 5a). Cores $(n-1)$ and $(n+1)$ are in the "1" state and core $n$ is in the "0" state. A current pulse at clock time W resets cores $(n-1)$ and $(n+1)$ and charges capacitor $Co$ as shown. The charging current has no effect on core $n$ since it is already in the reset conidtion. Cores $(n-1)$ and $(n+1)$ have no voltage across their input windings since the flux is already in the reset condition in leg I. When the output voltage from core $(n-1)$ becomes smaller than the voltage on capacitor Co, the current in circuit 52 reverses and switches core $n$ to the FIG. 5b condition and charges C1. Capacitor C1 loads core $n$ during the initial switching but switches the remaining flux in leg III when it discharges. Core $n$ is in the 5c condition after C2 discharges. Since the core $(n+1)$ is being driven and thereby is being held in the reset condition by the W pulse, the charging and discharging of capaictor C1 has no effect on core $(n+1)$. The shorted inhibit winding N6 prevents any flux change in leg IV.

A pulse at clock X holds cores $(n-1)$ and $(n+1)$ in the reset condition while switching core $n$ to the input reset condition. Core $(n-1)$ is held in the reset state while leg I of the core $n$ is being reset so that no back transfer will occur. A clock pulse at Y time now resets core $n$ and charges C1 so that core $(n+1)$ is in the condition shown by FIG. 5c when capacitors C1 and C2 discharge. The pulse at clock Z resets leg I of cores $(n-1)$ and $(n+1)$ while holding core $n$ in the reset condition. If no input is present at input time, a core remains in the reset condition during all clock pulses.

Figure 8:
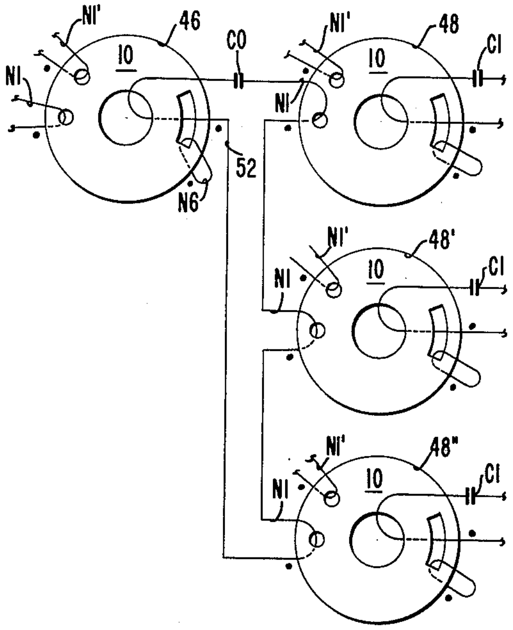
FIGURE 8 illustrates the practice of this invention with branching from a precedent core to a plurality of subsequent cores.

The manner in which the invention hereof transfers binary information to a plurality of branched circuits will be understood through reference to FIG. 8. The flux-gain core 10 (FIG. 1) provides adequate stored binary information for easy branching. Identification numerals are as for FIG. 6 where applicable. The timing of the circuit of FIG. 8 is as shown in FIG. 7. The capacitor coupling winding 52 is shown threading subsequent cores 48, 48′ and 48″. The input pulse to N1 which causes a transfer of binary stored information from core 46 to core 48 also causes the transfer of the same binary information to cores 48′ and 48″.

Figure 9:
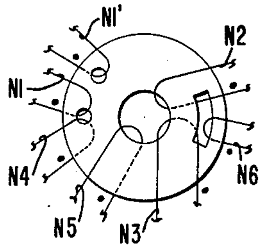
FIGURE 9 illustrates the manner of arranging windings on a multiaperture-core for a variation of the OR logic circuit of this invention.

FIG. 9 illustrates a multiaperture-core and windings suitable for variation of the OR logic circuit of FIG. 6. In comparison with FIG. 1, the core and the windings are identical except for drive winding N3 and inhibit winding N6. Drive winding N3 encircles leg III via apertures 14 and 16. It switches the flux in legs III and IV during drive time. The inhibit winding N6 is pulsed when the core is receiving an input to prevent flux switching in leg IV. Input reset on winding N4 switches flux around aperture 12 and drive on winding N3 switches flux around aperture 16, and they can occur simultaneously. Therefore, the core can receive an input and give an output at successive clock times.

While the invention has been particularly shown and described with reference to a preferred embodiment, it will be understood by those skilled in the art that the foregoing and other changes in form and details may be made therein without departing from the spirit and scope of the invention.

What is claimed is:

In an OR logic circuit comprising a first and a second multiaperture-core with input states and output states, each of said cores having a substantially rectangular hysteresis loop characteristic, said states being determined by the remanent magnetic flux condition around first and second apertures in said core, respectively, representative of stored binary information; each said core having first, second, third and fourth legs defining respective cross-sectional areas of the core associated with the first and second apertures and a third aperture in said core, each said core having an input winding on said first leg, an input-reset winding on said first leg, a drive winding passing solely through the second opening of said core, a core-reset winding passing solely through the second opening, an inhibit winding on said fourth leg and an output winding on said third leg; clock pulse timing means providing sequential first, second, third and fourth clock pulses, said first clock pulse being applied to said drive winding on said first core, said second clock pulse being applied to said core-reset winding on said first core and said input-reset winding on said second core, said third clock pulse being applied to said drive winding on second core and said fourth clock pulse being applied to said input-reset winding on said first core and said core-reset winding on said second core; a series capacitor circuit coupling said third leg of said first core to said first leg of said second core; means to store a particular binary bit of information in said third leg of said first core; said clock pulse means transferring said binary information to said second core during discharge of said coupling capacitor therebetween; the improvement in combination therewith including: each said core being capable of having a greater amount of flux in its output state than in its input state whereby more energy is transferred from the output state of said first core to the input state of said second core.

References Cited by the Examiner

UNITED STATES PATENTS

| | | | |
|---|---|---|---|
| 2,847,659 | 8/58 | Kaiser | 340—174 |
| 2,852,699 | 9/58 | Ruhman | 307—88 |
| 2,889,542 | 6/59 | Goldner et al. | 340—174 |
| 2,911,628 | 11/59 | Briggs et al. | 340—174 |
| 2,968,795 | 1/61 | Briggs et al. | 340—174 |
| 3,027,545 | 3/62 | Kodis | 340—174 |

FOREIGN PATENTS

Publication I: RCA Technical Notes No. 254, June 1959.

IRVING L. SRAGOW, *Primary Examiner.*

STEPHEN W. CAPELLI, *Examiner.*